US009298489B2

(12) United States Patent
Richard et al.

(10) Patent No.: US 9,298,489 B2
(45) Date of Patent: Mar. 29, 2016

(54) METHOD AND SYSTEM FOR IDENTIFYING VIRTUALIZED OPERATING SYSTEM THREATS IN A CLOUD COMPUTING ENVIRONMENT

(71) Applicant: IOMAXIS, INC., Springfield, VA (US)

(72) Inventors: John Richard, Springfield, VA (US);
David L. Branca, Springfield, VA (US);
Brad Buhr, Springfield, VA (US)

(73) Assignee: IOMAXIS, INC., Springfield, VA (US)

( * ) Notice: Subject to any disclaimer, the term of this patent is extended or adjusted under 35 U.S.C. 154(b) by 223 days.

(21) Appl. No.: 14/105,982

(22) Filed: Dec. 13, 2013

(65) Prior Publication Data

US 2014/0108652 A1    Apr. 17, 2014

Related U.S. Application Data

(60) Provisional application No. 61/749,076, filed on Jan. 4, 2013.

(51) Int. Cl.
*G06F 9/455* (2006.01)
*G06F 11/00* (2006.01)
*G06F 15/173* (2006.01)
*H04L 12/26* (2006.01)
*H04L 29/06* (2006.01)
*G06F 11/30* (2006.01)
*G06F 11/34* (2006.01)
*G06F 21/55* (2013.01)

(52) U.S. Cl.
CPC ........ *G06F 9/45545* (2013.01); *G06F 9/45533* (2013.01); *G06F 9/45558* (2013.01); *G06F 11/3003* (2013.01); *G06F 11/3428* (2013.01); *G06F 11/3438* (2013.01); *G06F 21/55* (2013.01); *H04L 43/16* (2013.01); *H04L 63/1408* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

2005/0132122 A1    6/2005 Rozas
2007/0283192 A1    12/2007 Shevchenko
2012/0079596 A1*   3/2012 Thomas ............... G06F 21/55
                                                    726/24
2012/0291094 A9*   11/2012 Forrester ............. H04L 63/12
                                                    718/1

OTHER PUBLICATIONS

"Hypervisor," accessed Jul. 9, 2013; version as re-accessed Nov. 12, 2014; wikipedia.org/wiki/Hypervisor.
"Much Ado About Type-2," Oct. 14, 2010; ok-labs.com/blog/entry/much-ado-about-a-type-2/.
"Cloud Computing#Service Models," first accessed Jul. 9, 2013, version as re-accessed Nov. 12, 2014; .wikipedia.org/wiki/Cloud_computing.
USPTO Non-final Office Action issued in U.S. Appl. No. 14/105,965 dated Sep. 25, 2015.

* cited by examiner

*Primary Examiner* — Mengyao Zhe
*Assistant Examiner* — Bing Zhao
(74) *Attorney, Agent, or Firm* — RatnerPrestia

(57) ABSTRACT

Systems for monitoring a virtual machine in a cloud computing environment are disclosed. The systems include a baseline module configured to retrieve baseline information from the virtual machine and create a plurality of baseline files. The systems also include a benchmark module configured to comparatively analyze at least two of the plurality of baseline files to determine differences between the at least two baseline files and generate a plurality of benchmark reports based on the determined differences. The systems also include a trends module configured to comparatively analyze the plurality of benchmark reports and generate at least one trends report based on the comparative analysis of benchmark reports.

10 Claims, 5 Drawing Sheets

METHOD AND SYSTEM FOR IDENTIFYING VIRTUALIZED OPERATING SYSTEM THREATS IN A CLOUD COMPUTING ENVIRONMENT

CROSS-REFERENCE TO RELATED APPLICATIONS

This application claims priority to U.S. Provisional application Ser. No. 61/749,076 entitled "Method and System for Automatically Identifying Changes to the Integrity and Security of a Virtualized Operating System in a Cloud Computing Environment" filed on Jan. 4, 2013, the contents of which are incorporated fully herein by reference.

FIELD OF THE INVENTION

The present invention relates to monitoring virtualized operating systems in cloud computing environments.

BACKGROUND OF THE INVENTION

Infrastructure as a service cloud computing environments manage and provision virtual machines for multiple, independent users to access locally or remotely. The abundance of users and the evolving nature of anomalous software have led to concerns over the security and integrity of such computing environments.

Trusted environments (i.e., environments where user access to physical hardware is known, the hardware vendors are known, the guest virtual machines are known, etc.) provide fewer challenges to implementing known security measures. However, such known security measures are less successful in untrusted environments due to a high level of uncertainty pertaining to the physical access of hardware by the hosting party, the hardware itself, and information reflecting the interactions between the virtual machines and the host machine. There is a need for successful security and integrity measures to be implemented in untrusted environments.

SUMMARY OF THE INVENTION

Aspects of the invention include systems for monitoring a virtual machine in a cloud computing environment. The systems include a baseline module configured to retrieve baseline information from the virtual machine and create a plurality of baseline files. The systems also include a benchmark module configured to comparatively analyze at least two of the plurality of baseline files to determine differences between the at least two baseline files and generate a plurality of benchmark reports based on the determined differences. The systems also include a trends module configured to comparatively analyze the plurality of benchmark reports and generate at least one trends report based on the comparative analysis of benchmark reports.

Further aspects of the invention are embodied in methods for monitoring a virtual machine in a cloud computing environment generating, with a baseline module, a plurality of baseline files containing baseline information of a virtual machine. The methods also include receiving at least two of the plurality of baseline files and comparatively analyzing, with a benchmark module, the at least two baseline files to determine differences between the at least two baseline files. The methods also include storing the determined differences in a benchmark report as threats.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures.

DETAILED DESCRIPTION OF THE INVENTION

Figure 1:
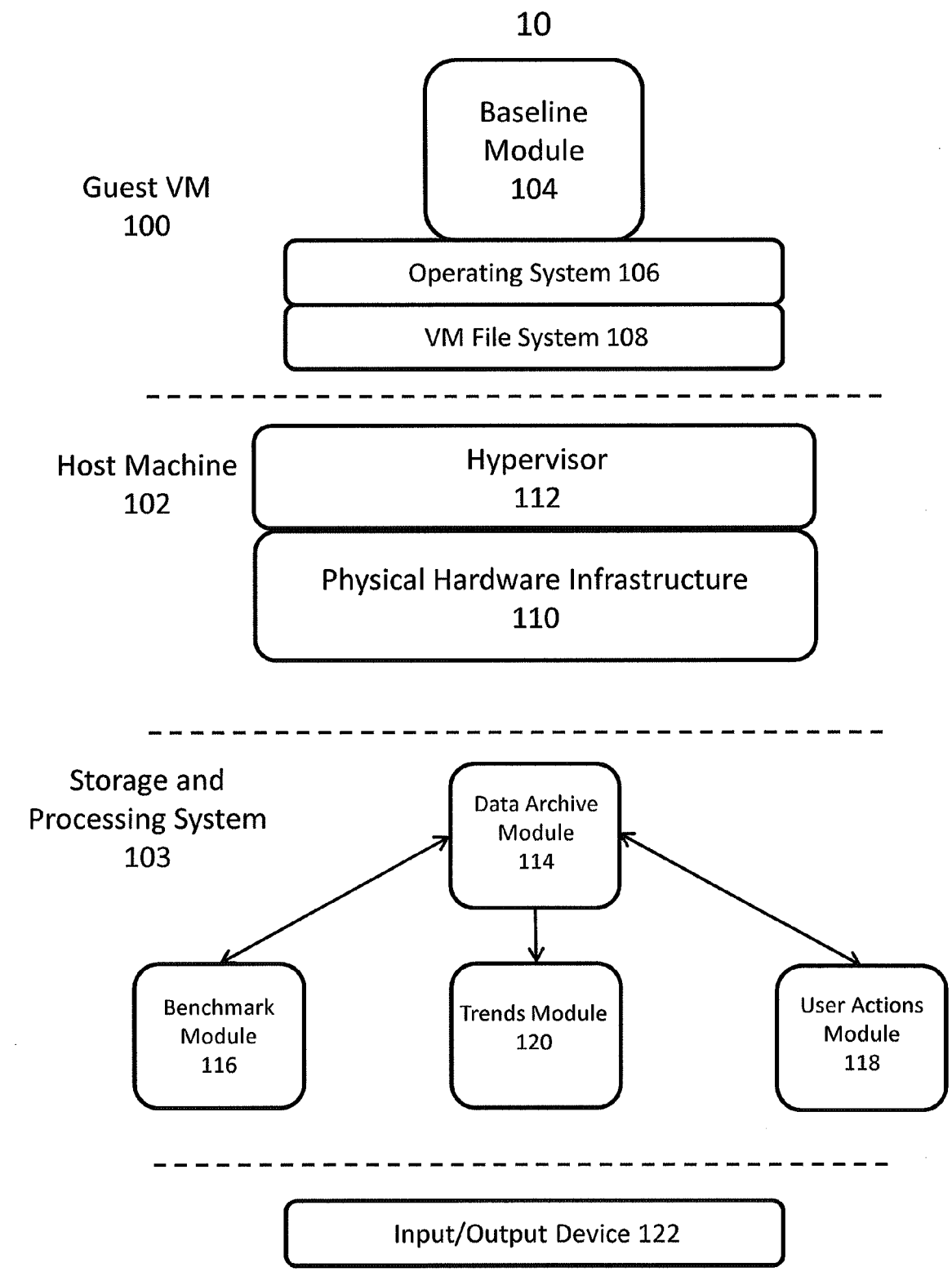
FIG. 1 is a block diagram of a system for detecting integrity and security changes in a virtualized operating system according to aspects of the invention.

Referring to FIG. 1, a system 10 for detecting integrity and security changes in a virtualized operating system is shown in accordance with an embodiment of the invention. The illustrated system 10 includes a host machine 102, a guest virtual machine (VM) 100 that accesses the host machine's 102 resources through a hypervisor 112, a storage and processing system 103, and an input/output device 122. The guest VM 100 runs on the host machine 102 and relies on the physical hardware 110 of the host machine 102 for computing resources. The system 10 may be configured to allow multiple guest VMs to access the host machine 102 simultaneously. General configurations of guest VMs and host machines will be understood by one of skill in the art from the description herein.

The guest VM 100 includes a baseline module 104, an operating system 106, and a VM file system 108. The baseline module 104 resides on the guest VM 100 and executes on the operating system 106 of the guest VM 100. The baseline module 104 is configured to collect data on the guest VM 100 and store the data on the VM file system 108. In an embodiment, the baseline module 104 is configured to allow access to the collected data for transmission and secure storage on the storage and processing system 103. The data collected by the baseline module 104 may include information specific to physical devices presented to the operating system 106, virtual devices presented to the operating system 106, various packages installed on the operating system 106, etc. In one embodiment, the baseline module 104 is configured to package the collected data into a standardized, raw file format that is only machine readable (i.e., cannot be interpreted by a human without the aid of a computer). The guest VM 100 including the baseline module 104 is described in further detail below with reference to FIG. 2.

The host machine 102 includes a hypervisor 112 and physical hardware infrastructure 110. The hypervisor 112 manages the operations between the guest VM 100 and the host machine 102. The system 10 may be configured such that the hypervisor 112 is a bare metal (Type 1) hypervisor that runs directly on the host machine 102 and/or a hosted (Type 2) hypervisor that runs indirectly on the host machine 102 through an operating system (not shown) operated by the host machine 102. Other suitable hypervisors for the system 10 will be understood by one of skill in the art from the description herein. The physical hardware infrastructure may be a conventional computing system, such as a server, desktop, laptop or other system including a processor. Suitable hardware infrastructures will be understood by one of skill in the art from the description herein.

The storage and processing system 103 includes a data archive module 114, a benchmark module 116, a user actions module 118, and a trends module 120. The storage and processing system 103 may be coupled to the host machine 102 and/or guest VM 100. In one embodiment, the storage and processing system 103 is offline from the cloud environment (i.e., the host machine 102 and guest VM 100), thereby providing a highly secure system capable of detecting changes in the guest VM and/or host machine within an untrusted environment. The modules 114, 116, 118, 120 may each reside in the storage and processing system 103. It is contemplated that some or all of the modules 114, 116, 118, 120 may reside in the cloud environment. In an embodiment, the modules 114, 116, 118, 120 reside within a trusted single storage and processing system. In embodiments where scalability is of concern, the modules 114, 116, 118, 120 may reside on multiple storage and processing systems. The benchmark module 116 and the user actions module 118 are configured to have a bidirectional data flow with the data archive module 114, whereas the trends module 120 has a unidirectional data flow with the data archive module 114. It is contemplated that alternative directional data flows between the modules 114, 116, 118, 120 may be utilized in accordance with aspects of the invention. The functionality of modules 114, 116, 118, 120 and the storage and processing system 103 is further described below with reference to FIGS. 3 and 4. The storage and processing system 103 may include one or more conventional computing systems. Suitable computing systems will be understood by one of skill in the art from the description herein.

The input/output device 122 is configured to present data and/or reports to a user in a user-readable format and to receive inputs (e.g., user actions, parameters for baseline files, benchmark reports, trends reports, etc.) from a user when necessary to facilitate operation of the system 10. The input/output device 122 may be coupled to the offline storage system 103, the host machine 102, and/or the guest VM 100. The input/output device 122 may be a monitor and keyboard, mobile device (e.g., cellular phone, smart phone), tablet device, etc. In one embodiment, the input/output device 122 is configured to be wirelessly connected (e.g., via Bluetooth, cellular network, WiFi, etc.) to the system 10. Other suitable hypervisors and input/output devices for the system 10 will be understood by one of skill in the art from the description herein.

Figure 2:
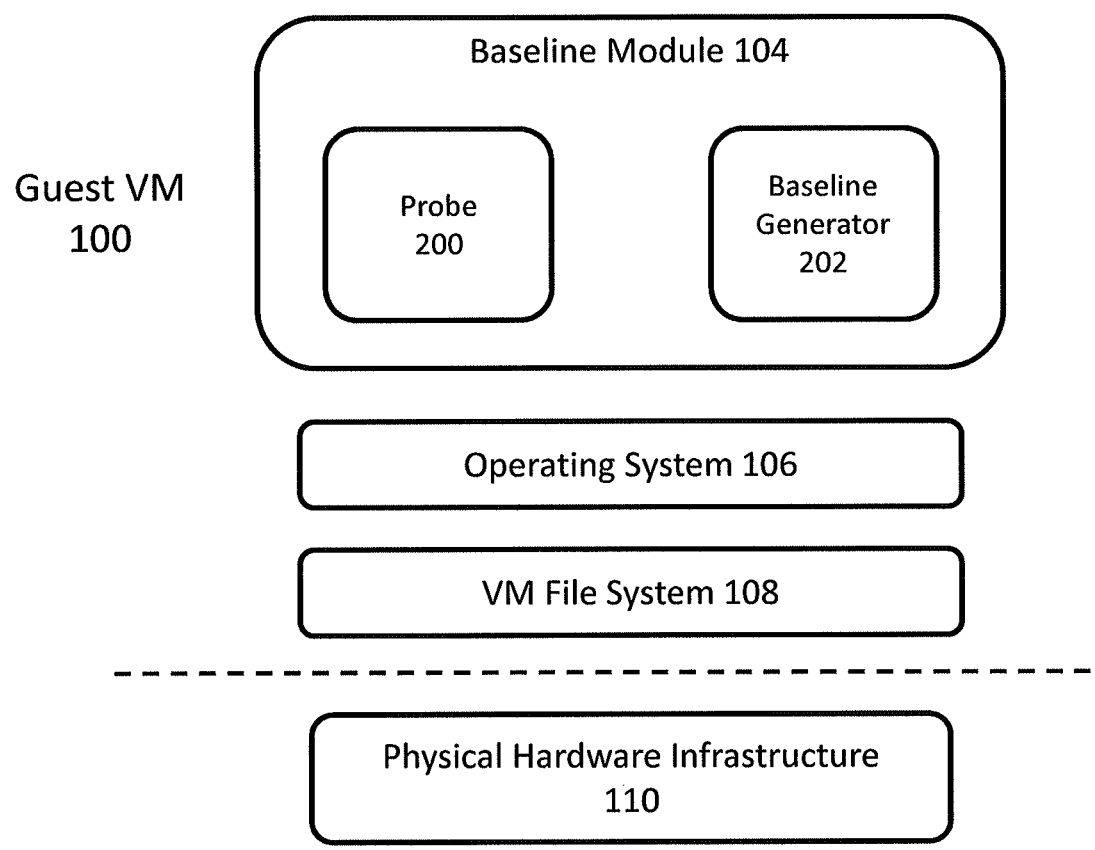
FIG. 2 is a block diagram of a guest virtual machine for use in the system depicted in FIG. 1 in accordance with aspects of the invention.

At FIG. 2, a detailed depiction of a guest VM 100 is shown according to aspects of the invention. The baseline module 104 in the guest VM 100 includes a probe 200 and a baseline generator 202. The probe 200 is configured to query the system 10 and/or the individual components of system 10 (e.g., the guest VM 100, the host machine 102, etc.) for information. In an embodiment, the probe 200 is configured to query the guest VM 100 for information. The probe 200 may be a module and/or a program installed in the baseline module 104 that executes a routine to query for information. The probe 200 communicates through the operating system 106 to query the VM file system 108, the physical hardware infrastructure 110, and/or virtual hardware components (not shown) and collects the information from the query. The probe 200 may be configured to query the system 10 automatically, at designated intervals, by request of a user, upon launching of the guest VM 100, etc. The information queried by the probe 200 may include packages installed in the operating system 106, physical disk layout, logical disk layout, available logs, firewall policies, security policies, user accounts, group accounts, running processes, unwarranted user login attempts, sensitive system file changes (e.g., changes to configuration files based on time stamp data), changes in network interface number, changes in resource utilization, CPU usage, CPU temperature, serial numbers of hardware devices, etc. In one embodiment, the probe 200 queries the system 10 for known signatures of anomalous software (e.g., malware, rootkits, viruses, worms, etc.). The description above of the information queried by the probe 200 is exemplary and not exhaustive. Other suitable information to be queried by the probe 200 will be understood by one of skill in the art from the description herein.

The probe 200 may collect the information as raw data and then send the data to the baseline generator 202. The baseline generator 202 receives the data from the probe 200, aggregates the data, and compiles the data into a single baseline file. The data may be compiled into multiple baseline files. In an embodiment, the data in the baseline file is in a raw format and not human readable. The baseline generator 202 may be configured to securely write the baseline file(s) to the VM file system 108 to be retrieved. A user of the system 10 may retrieve the baseline files and move the baseline files to the storage and processing system 103.

Figure 3:
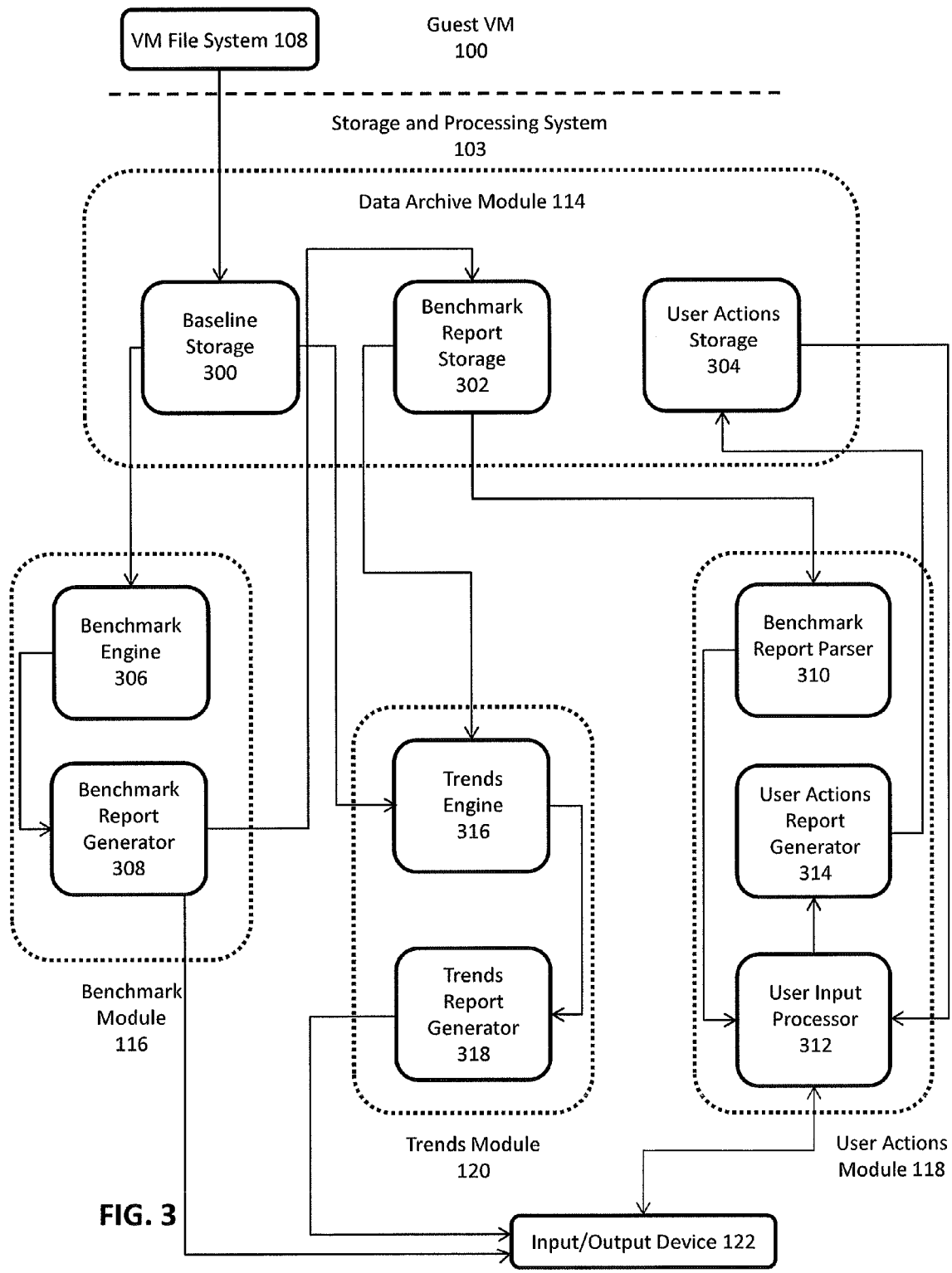
FIG. 3 is a block diagram depicting the storage and processing of FIG. 1 in further detail in accordance with aspects of the invention.
Figure 4:
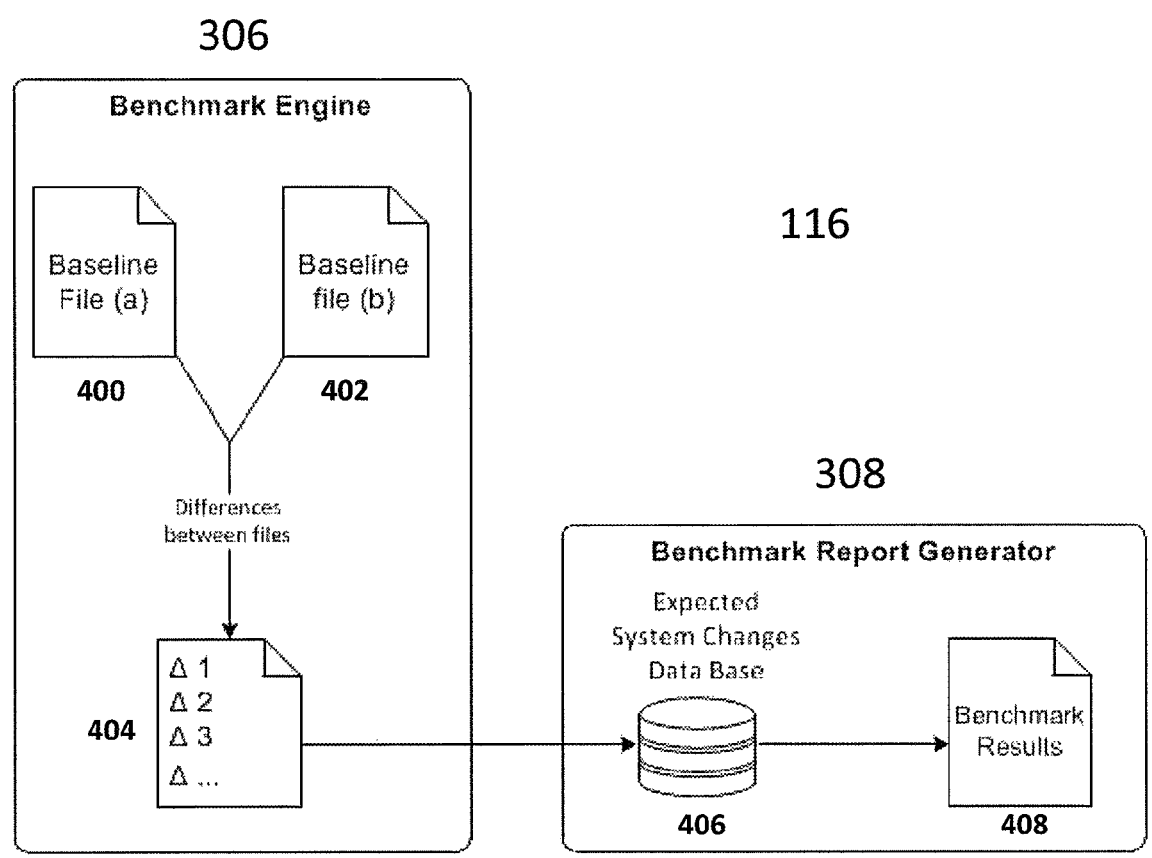
FIG. 4 is a block diagram depicting a benchmark module according to aspects of the invention.

Referring next to FIGS. 3 and 4, the data archive module 114, benchmark module 116, user actions module 118 and trends module 120 are depicted in further detail according to aspects of the invention. The data archive module 114 includes baseline storage 300, benchmark report storage 302, and user actions storage 304. The benchmark module 116 has a benchmark engine 306 and a benchmark report generator 308. The user actions module includes a benchmark report parser 310, a user input processor 312 and a user actions report generator 314. The trends module 120 includes a trends engine 316 and a trends report generator 318.

The baseline storage 300 of the data archive module 114 is configured to receive and store baseline files stored in the VM file system 108 on the guest VM 100. In an embodiment, the baseline storage 300 is configured to receive the baseline files from the baseline generator 202 of the baseline module 106. The baseline storage 300 may be queried by the benchmark module 116, the user actions module 118, and/or the trends module 120 to send baseline files to the respective module. In one embodiment, the baseline files are received and stored on the data archive module 114 based on predetermined time intervals or upon request of a user of system 10. The baseline files may be received and stored on the data archive module 114 while the guest VM 100 resides on the host computer 102.

The benchmark module 116 includes a benchmark engine 306 that is coupled to a benchmark report generator 308. In an embodiment, the benchmark report generator 308 performs the functions of the benchmark engine 306. In the embodiment depicted by FIG. 3, the benchmark engine 306 is configured to query the baseline storage 300 to receive a plurality of baseline files from the baseline storage 300. In one embodiment, the benchmark engine 306 queries the baseline storage 300 for two baseline files. The benchmark report generator 308 may include an expected system changes database 406 as depicted in FIG. 4. The expected system changes database 406 stores changes that are expected in the system 10. Examples of expected system changes include changes due to software updates, authorized user login, increased CPU usage due to non-anomalous program execution, etc. Other expected system changes suitable to be stored in the expected system changes database will be understood by one of skill in the art from the description herein.

In one embodiment, with reference to FIG. 4, the benchmark engine 306 queries the baseline storage 300 and receives two baseline files, baseline file (a) 400 and baseline file (b) 402, where baseline files 400, 402 were created from the same VM at different times by the baseline generator 202. The benchmark engine 306 may be configured to query the baseline storage 300 for baseline files that were created at the same time from different guest VMs. Although two baseline files are depicted and described herein in detail, it is to be understood that more than two baseline files can be received and analyzed.

In an embodiment, the benchmark engine 306 is configured to comparatively analyze the data of the baseline files 400, 402 to determine the differences between the files 400, 402. The determined differences 404 may be stored as a file and/or report or may be sent transitorily to the benchmark report generator 308. The benchmark report generator 308 receives the determined differences 404 and comparatively analyzes the determined differences 404 with the expected system changes database 406 to identify unexpected system changes as potential threats. In an embodiment, the benchmark report generator 308 is configured to identify known threats from the determined differences 404. For example, a known threat, such as a particular computer virus, may be associated with a difference that is a characteristic of that virus. The known threats (characteristic differences) may be stored in the expected system changes database 406 and/or a known threats database (not shown). In one embodiment, the benchmark report generator 308 and/or benchmark engine 306 are configured to identify anomalous files present in the system 10 and/or in the individual components of system 10 (e.g., the guest VM 100, the host machine 102, etc.) as may be indicated by a single baseline report 400 without comparative analysis. For example, a malicious file may be present in the system 10 at the time the baseline file 400 was generated and the presence of the malicious file is indicated in the baseline file 400, such that a second baseline file 402 is not required to identify the malicious file. In an embodiment, the benchmark report generator 308 and/or benchmark engine 306 are configured to identify anomalies present in the system 10 as may be indicated by comparative analysis of two baseline files, each from a different guest VM.

Once the benchmark report generator 308 identifies known threats, potential threats, anomalies, and/or anomalous files, the benchmark report generator 308 generates a benchmark report 408 containing the identified threats, anomalies and/or anomalous files. In one embodiment, the benchmark report 408 is user-readable and may be displayed to the user of system 10 via the input/output device 122. The benchmark report generator 308 may be configured to send the generated benchmark report(s) 408 to the benchmark report storage 302 of data module 114, which is configured to receive and store a plurality of benchmark reports 408.

Referring back to FIG. 3, the benchmark report storage 302 is coupled to the user actions module 118. A user input processor 312 is coupled to the benchmark report parser 310 and may be further coupled to the input/output device 122 of the system 10. The user input processor 312 may be configured to receive an input from a user through the input/output device 122 to define a benchmark report to be pulled. The input is sent to the benchmark report parser 310 which queries the benchmark report storage 302 for the benchmark report corresponding to the input. In an embodiment, the input defines a plurality of benchmark reports to be pulled. Once the benchmark report is pulled, the benchmark report parser 310 sends the benchmark report to the user input processor 312 and the user input processor 312 displays the benchmark report. The displayed benchmark report may indicate to the user threats to and/or anomalies in the system 10 and/or in the individual components of system 10 (e.g., the guest VM 100, the host machine 102, etc.) identified by the benchmark module 116. In one embodiment, the identified threats are presented to the user in a dynamic input form allowing the user to input data (e.g., information, comments, suggestions, actions to take, etc.) addressing the threats.

A user actions report generator 314 is coupled to the user input processor 312 and receives, from the user input processor 312, the actions taken by the user with respect to the identified threats to generate a user actions report. The user actions report allows the user to track changes made to a guest VM 100 to mitigate threats identified in the benchmark report and provides a user with a record of system administrator changes made based on the identified threats. The user actions report generator 314 may be further configured to send the generated user actions report to the user actions storage 304 of the data archive module 114.

In one embodiment, the user input processor 312 is configured to query the user actions storage 304 and retrieve user action report(s) to display to the user in conjunction with the benchmark report pulled by the benchmark report parser 310. In such an embodiment, the input/output device 122 displays to the user the benchmark report containing identified threats along with the user actions report(s) containing prior user actions taken with respect to the corresponding identified threats of previous benchmark reports.

Additional details regarding the trends module 120 are now provided. The trends module 120 is coupled to the data archive module 114 and to the input/output device 122, and also includes a trends engine 316 coupled to a trends report generator 318. The trends engine 316 may be configured to query the benchmark report storage 302 and/or the baseline storage 300 and receive a plurality of benchmark reports from the benchmark report storage 302 and/or a plurality of baseline files from the baseline storage 300. The plurality of benchmark reports/baseline files received by the trends engine 316 may be based on a user-defined selection and/or an automated selection. Once the benchmark reports/baseline files are received, the trends engine 316 is configured to statistically and comparatively analyze the continuous and discrete data within the benchmark reports/baseline files with predefined analysis parameters (e.g., a selected property of the system such as CPU usage). The trends engine 316 may be configured to comparatively analyze data from a single sample set and/or comparatively analyze multiple data sets. For example, a trends engine that is configured to comparatively analyze data from a single sample set may utilize a control chart for analysis of changes in the predefined analysis parameter over time. A trends engine that is configured to comparatively analyze multiple data sets may compare and test the difference between the means of the individual data sets (e.g., t-test). The multiple data sets may originate from the same guest VM or from different guest VMs. Other suitable statistical analysis techniques will be understood by one of skill in the art from the description herein.

The trends engine 316 is configured to send the processed data to the trends report generator 318. The trends report generator 318 is configured to translate the processed data into a user-readable format as a trends report and output the trends report to the user via the input/output device 122. The trends report may be in the form of a control chart displaying the changes in the predefined parameters over time and/or a report showing a change in means from multiple data sets. It is contemplated that the trends report may be interactive such that a user of system 10 can parse through multiple analysis parameters in a single trends report.

Figure 5:
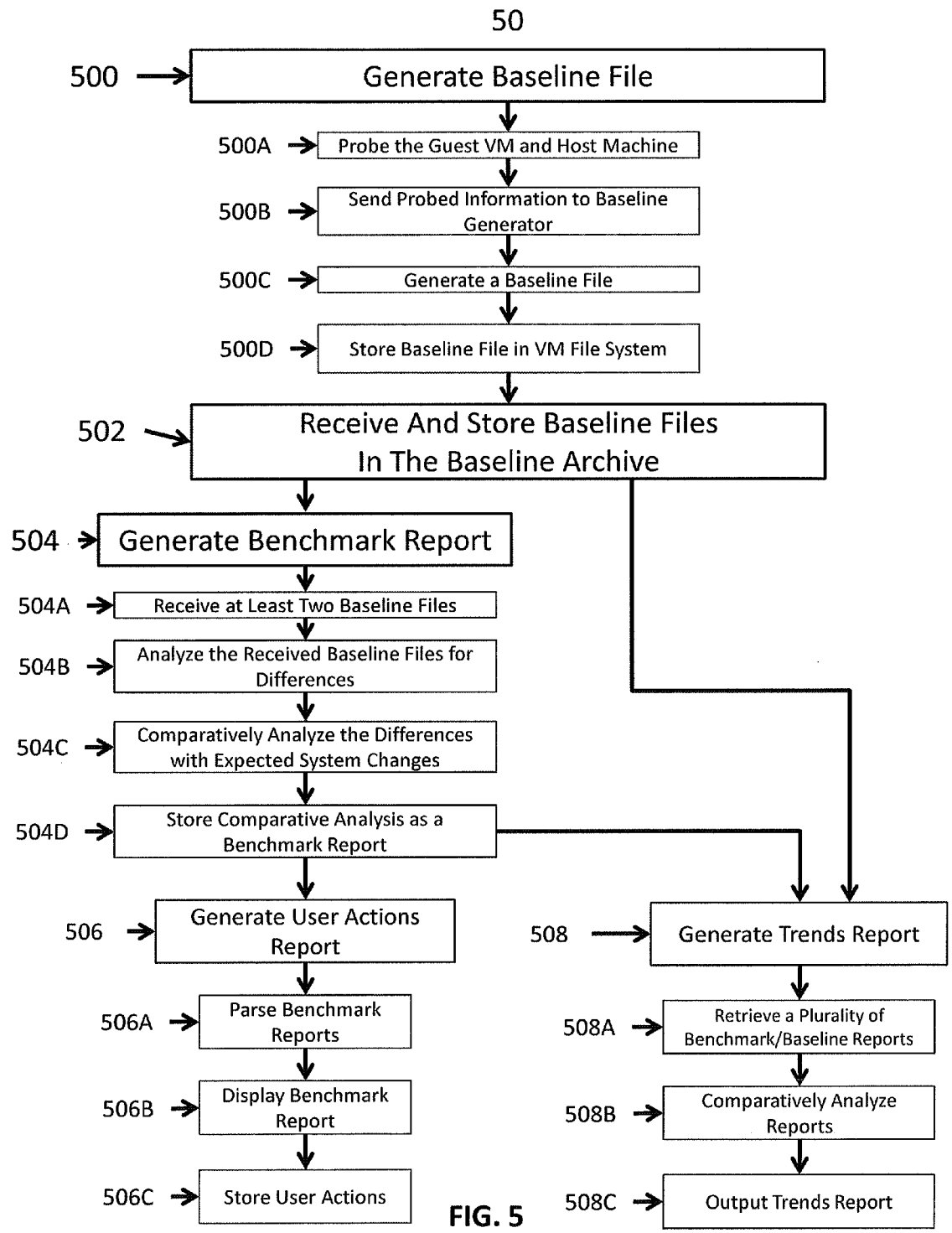
FIG. 5 is a flowchart of steps in a method according to aspects of the invention.

FIG. 5 is a flowchart 50 of exemplary steps for generating user actions reports and trends reports in accordance with aspects of the invention. Although reference to the components of system 10 will be made herein, it is contemplated that the following steps may be performed with variations of system 10 as will be understood by one of skill in the art from the description.

At block 500, a baseline file for a guest VM 100 is generated. In one embodiment, the baseline file is generated by a baseline module 104 that exists on a guest VM 100 hosted in the cloud. The baseline file includes data relating to the state of the system 10 queried at a point in time. The data may include information relating to packages installed in the operating system 106, physical disk layout, logical disk layout, available logs, firewall policies, security policies, user accounts, group accounts, running processes, unwarranted user login attempts, sensitive system file changes (e.g., changes to configuration files based on time stamp data), changes in network interface number, changes in resource utilization, CPU usage, CPU temperature, serial numbers of hardware devices, known signatures of anomalous software (e.g., malware, rootkits, rootkits, viruses, etc.), etc. The data may include data that, when compared to other baseline files, contains directly observable changes (e.g., file location) and/or indirectly observable changes (e.g., CPU temperature, memory allocation, etc.). The description above of the information is exemplary and not exhaustive. Other suitable information will be understood by one of skill in the art from the description herein.

Blocks 500A-500D depict an exemplary method for generating the baseline file of block 500. At block 500A, the guest VM 100 and the host machine 102 are queried for data via a probe 200. In an embodiment, the probe 200 resides in the baseline module 104. At block 500B, the probe 200 sends the queried data to the baseline generator 202. At block 500C, the baseline file is generated. At block 500D, the generated baseline file is securely stored in the VM file system 108 to be retrieved at a later time. In one embodiment, the data is one way encrypted and hashed to ensure secure storage and to prevent tampering prior to the file being retrieved.

At block 502, the generated baseline files are sent to the storage and processing system 103. In an embodiment, the baseline files are sent to the baseline storage 300 of the data archive module 114. The baseline files may be sent indirectly to the baseline storage 300 (i.e., through the VM file system 108) or directly to the baseline storage 300 (i.e., via the baseline generator 202).

At block 504, a benchmark report is generated. In an embodiment, the benchmark report contains anomalies and identified threats based on unexpected changes between a plurality of baseline reports and/or between multiple pluralities of baseline reports. Such issues can include known threats (i.e., differences between baseline files associated with predefined threats), potential threats (i.e., known/experienced differences between baseline files that suggest possible threats and/or multiple threats), anomalous files (malware, rootkits, viruses, worms, etc.), etc. Other threats that may be identified in the benchmark report will be understood by one of skill in the art from the description herein.

Blocks 504A-504D depict an exemplary method for generating the benchmark report of block 504. At block 504A, at least two baseline files are received by the benchmark module 116 to be comparatively analyzed in generating the benchmark report. The baseline files may be received by the benchmark engine 306 of the benchmark module 116. In one embodiment, a benchmark report is generated based on one baseline file where the benchmark report is generated to identify anomalous files. It is contemplated that any number of baseline files may be received and analyzed to generate a benchmark report.

At block 504B, the received baseline files are comparatively analyzed to determine the differences between the received files. Differences between baseline files may include change in file location, CPU temperature, permissions, CPU usage, etc. Other differences between baseline files that can be determined for use in a benchmark report will be understood by one of skill in the art from the description herein.

At block 504C, the determined differences are comparatively analyzed with an expected system changes database 406 (i.e. software updates). The determined differences may also be comparatively analyzed with a known changes database that contains changes known to be associated with particular or potential threats.

At block 504D, the results of the comparative analysis are compiled into a benchmark report and stored to be retrieved at a later point in time. In one embodiment, the benchmark report is user-readable. The benchmark report may be stored in the benchmark storage 302 of the data archive module 114. In one embodiment, the benchmark report is in a user-readable format and may be displayed to the user via the input/output device 122.

Utilizing the benchmark reports generated at block 504, a user actions report may be generated at block 506. Blocks 506A-506C depict an exemplary method for generating the user actions report of block 506. At block 506A, the benchmark reports stored in the benchmark reports storage 302 are parsed and at least one benchmark report is pulled. The benchmark reports may be parsed by the benchmark report parser 310 of user actions module 118. In one embodiment, the benchmark report is pulled according to a selection by a user (e.g., date and time selection). The benchmark report may be pulled at random and/or according to a predetermined schedule.

At block 506B, the pulled benchmark report is displayed in a user-readable format to the user via the input/output device 122 of the system 10. In one embodiment, the benchmark report includes the identified threats and anomalies. The user may take actions based on the threats displayed in the benchmark report. In one embodiment, the identified threats are presented to the user in a dynamic input form allowing the user to take an action, such as input data (e.g., information, comments, suggestions, actions, etc.), to address the threats.

At block 506C, the user actions corresponding to the threat are stored as a user actions report. The user actions report may be stored in the user actions storage 304 of the data archive module 114. Referring back to block 506B, the user actions storage 304 may be queried to identify previous user actions taken with respect to an identified threat in the displayed benchmark report. In one embodiment, the user actions report corresponding to the previous user action taken with respect to the identified threat in the previous benchmark report is displayed with the benchmark report to provide the user with information related to previous actions taken for the identified threat. Information of previous actions taken may include the user of the action, the date and time of the action, the deposition of the action, the status of the action, etc. In such an embodiment, the new user action taken is stored as a new user actions report.

At block 508, a trends report is generated. The trends report reflects the state of the system 10 over a period of time and the changes in the system 10 and/or in the individual components of system 10 (e.g., the guest VM 100, the host machine 102, etc.) over that period of time. By combining various benchmark reports and/or baseline files with each other, the user is provided with the ability to track abnormalities and trends that may not be otherwise reflected in a single baseline file, a single benchmark report or by a one-to-one comparison of benchmark reports. As an example, the CPU temperature between small time intervals is expected to vary (i.e. an expected system change that would be stored in the expected system changes database 406) because the CPU load on processors varies. If the CPU temperature of a host machine 102 was an average of about 50 C across all baseline files within a small time period (i.e. 1 day), small variations would likely be expected. As such, comparing baseline files (either with the benchmark module 116 or the trends module 120) that were only taken within 1 day would report negligible or expected changes. However, if for 6 subsequent months, for example, the average CPU temperature very gradually rose from 50 C to 60 C, single baseline files or even benchmark reports and trends reports that comparatively analyze baseline files on a per day, chronological basis would not indicate an unexpected change or anomaly and would not identify the potential threat because the time interval of the sample size is too short and the gradual, incremental increase in temperature would be considered minimal (e.g., anomalous files causing an increase in average CPU load, decreased performance or failure of the CPU fan, increased ambient temperature, etc.). Thus, the ability of the trends module 120 to perform statistical analysis of a plurality of baseline files or benchmark reports over a long period of time, coupled with the secure structure of system 10, allow for such anomalies and threats that would normally go undiscovered to be detected in an untrusted cloud computing environment.

Blocks 508A-508C depict an exemplary method for generating the trends report of block 508. At block 508A, the trends module 120 retrieves a plurality of baseline files from the baseline storage 300 or a plurality benchmark reports from the benchmark report storage 302 in the data archive module 114. The number of baseline files/benchmark reports retrieved may be defined by a time interval, a pre-selection, at random, etc. The baseline files/benchmark reports may be retrieved by the trends engine 316, the trends report generator 318 or both.

At block 508B, the retrieved baseline files/benchmark reports are comparatively analyzed with predefined analysis parameters to determine the state of the system 10 and/or in the individual components of system 10 (e.g., the guest VM 100, the host machine 102, etc.) for the time period over which the baseline files/benchmark reports were generated utilizing statistical analysis methods as described with respect to FIG. 3. The baseline files/benchmark reports analyzed may be of a single sample set or multiple sample sets.

At block 508C, a trends report is generated based on the comparative analysis of the baseline files/benchmark reports and the trends report is output to the user through the input/output device 122. The trends report may be in the form of a control chart indicating statistical deviations based on rules known in the art of statistics (e.g., Western Electric rules, Wheeler rules, Nelson rules, etc.). In an embodiment where the trends module comparatively analyzes the baseline files/benchmark reports as multiple data sets, the trends report is a t-test report displaying differences between the means of the multiple sample sets. Other suitable trends reports to display based on the data analyzed will be understood by one of skill in the art from the description herein.

It is contemplated that the trends reports may be interactive. For example, a user of system 10 (e.g., a user of the storage and processing system 103) may request, via the input/output device 122, the baseline files or benchmark reports stored over a selected period of time to be comparatively analyzed. The user may then select the metric (e.g., CPU usage, CPU temperature, and/or any other information stored in the baseline files/benchmark reports) for which the user wishes the trends to be displayed via the input/output device 122. Other suitable presentations of trends reports will be understood by one of skill in the art from the description herein.

It will be appreciated that the systems, methods, and reports generated in accordance with the disclosure herein allow for a user to analyze and track the integrity and security of the system 10 under the assumption that the system 10 is operating in an untrusted computing environment. In other words, the system 10 is operable even with unknown hardware make and model, unknown software versions for hypervisors, unknown location of physical hardware, unknown user access to the physical hardware and the hypervisor, unknown other guest VMs running on the same hardware, and unknown network infrastructure.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer system containing at least one processor for monitoring one or more virtual machines in a cloud computing environment, the computer system comprising:
   a baseline module of a virtual machine executing on a host computer, the baseline module configured to:
   1) monitor performance of software of the virtual machine executing on the host computer to collect software information,
   2) monitor performance of hardware components of the host computer to collect hardware information, and
   3) create a plurality of machine readable baseline files based on the collected software information and hardware information; and
   a benchmark module, executing on a storage and processing computer separate from the host computer, the benchmark module configured to:
   1) comparatively analyze at least two of the plurality of machine readable baseline files to determine differences in the software information between the at least two machine readable baseline files,
   2) determine differences in the hardware information between the at least two machine readable baseline files, and
   3) generate a plurality of benchmark reports based on the determined differences;
   a trends module, executing on the storage and processing computer separate from the host computer, the trends module configured to:
   1) comparatively analyze the plurality of benchmark reports by performing a statistical analysis of the differences in software information and the differences in hardware information over a period of time, and
   2) generate at least one user readable trends report based on the comparative analysis of benchmark reports; and
   a user actions module, the user actions module configured to provide at least one of the plurality of benchmark reports to a user and to display a dynamic input form to the user when the provided at least one benchmark report indicates at least one threat to the cloud computing environment, wherein the dynamic input form enables the user to address the at least one threat.

2. The system of claim 1, further comprising a data archive module, the data archive module configured to store the plurality of machine readable baseline files and the plurality of benchmark reports.

3. The system of claim 1, wherein the at least one trends report comprises at least one threat to the cloud computing environment.

4. The system of claim 1, wherein the baseline information comprises at least one of software packages installed, physical disk layout, logical disk layout, logs, firewalls, security policies, user accounts, group accounts, or running processes.

5. The system of claim 1, wherein the baseline module exists on a guest virtual machine.

6. The system of claim 5, wherein the plurality of machine readable baseline files are stored on the guest virtual machine.

7. A method for monitoring one or more virtual machines in a cloud computing environment, the method comprising the steps of:

monitoring, by a baseline module of a virtual machine executing on a host computer, performance of software of the virtual machine executing on the host computer to collect software information, and performance of hardware components of the host computer to collect hardware information, creating, by the baseline module a plurality of machine readable baseline files based on the collected software information and hardware information, receiving, by a benchmark module, executing on a storage and processing computer separate from the host computer, at least two of the plurality of machine readable baseline files;

comparatively analyzing, by the benchmark module, the at least two baseline files to determine differences between in the software information and differences in the hardware information of the at least two machine readable baseline files;

storing the determined differences in a plurality of benchmark reports as threats;

comparatively analyzing the plurality of benchmark reports by performing a statistical analysis of the differences in software information and the differences in hardware information over a period of time and generate at least one user readable trends report based on the comparative analysis of benchmark reports;

displaying at least one of the plurality of benchmark reports and a dynamic input form to the user, wherein the dynamic input form allows the user to address the threats.

8. The method of claim 7, wherein the generating step is performed on a guest virtual machine.

9. The method of claim 7, further comprising the steps of:
retrieving the plurality of benchmark reports;
and
displaying the determined trends as a trends report.

10. The method of claim 7, further comprising the step of:
storing the actions of the user in response to the threats as a user actions report.

\* \* \* \* \*